United States Patent
Castellanos et al.

(10) Patent No.: US 11,675,792 B2
(45) Date of Patent: Jun. 13, 2023

(54) PARALLEL OPERATIONS RELATING TO MICRO-MODELS IN A DATABASE SYSTEM

(71) Applicant: TERADATA US, INC., San Diego, CA (US)

(72) Inventors: Maria Guadalupe Castellanos, Sunnyvale, CA (US); Xiang Zuo, Campbell, CA (US); Faraz Ahmad, Santa Clara, CA (US); Awny Kayed Al-Omari, Cedar Park, TX (US)

(73) Assignee: Teradata US, Inc., San Diego, CA (US)

( * ) Notice: Subject to any disclaimer, the term of this patent is extended or adjusted under 35 U.S.C. 154(b) by 178 days.

(21) Appl. No.: 17/134,607

(22) Filed: Dec. 28, 2020

(65) Prior Publication Data

US 2022/0207045 A1    Jun. 30, 2022

(51) Int. Cl.
| | |
|---|---|
| G06F 16/2457 | (2019.01) |
| G06F 16/22 | (2019.01) |
| G06F 16/2453 | (2019.01) |
| G06F 18/214 | (2023.01) |
| G06N 20/00 | (2019.01) |

(52) U.S. Cl.
CPC .... *G06F 16/24573* (2019.01); *G06F 16/2282* (2019.01); *G06F 16/24532* (2019.01); *G06F 18/214* (2023.01); *G06N 20/00* (2019.01)

(58) Field of Classification Search
CPC .... G06N 20/00; G06N 20/20; G06F 3/04842; G06F 3/067; G06F 3/0617; G06F 16/24573; G06F 16/2282; G06F 16/24532; G06F 18/214; G06F 9/5027
See application file for complete search history.

(56) References Cited

U.S. PATENT DOCUMENTS

| | | | | |
|---|---|---|---|---|
| 11,392,847 | B1* | 7/2022 | Abdollahian | G06N 20/00 707/999.003 |
| 2012/0323921 | A1* | 12/2012 | Chen | G06F 16/313 707/E17.09 |
| 2017/0308809 | A1* | 10/2017 | Mozes | G06F 16/212 |
| 2020/0125368 | A1* | 4/2020 | Kaldewey | G06F 16/2456 |

FOREIGN PATENT DOCUMENTS

EP    3985578 A1 *   4/2022      ............. G06N 20/00

OTHER PUBLICATIONS

Ding et al. (WO 2019/179408 A1) (Year: 2019).*
Formation—Hyper-Segmentation DrivesPersonalization to ImproveCustomer Experience, Aug. 26, 2020 (7 pages).
Wikipedia, Market segmentation last edited Dec. 7, 2020 (36 pages).

* cited by examiner

*Primary Examiner* — Yuk Ting Choi
(74) *Attorney, Agent, or Firm* — Trop, Pruner & Hu PC

(57) ABSTRACT

In some examples, a database system receives data relating to plural micro-models that apply respective analytics, and distributes a plurality of data segments of the received data across the plurality of processing engines based on values of a segmentation key included in the received data. A plurality of processing engines, performs in parallel, operations associated with the plural micro-models using respective data segments of the plurality of data segments, where different processing engines of the plurality of processing engines perform operations associated with respective micro-models of the plural micro-models.

20 Claims, 5 Drawing Sheets

PARALLEL OPERATIONS RELATING TO MICRO-MODELS IN A DATABASE SYSTEM

BACKGROUND

Analytics can be performed on customer data (or other types of data) to better understand customers of a vendor or for other purposes. The analytics can be performed on a segmented basis, in which data can be divided into data segments, and the analytics are separately performed on each data segment.

BRIEF DESCRIPTION OF THE DRAWINGS

Some implementations of the present disclosure are described with respect to the following figures.

Figure 1:
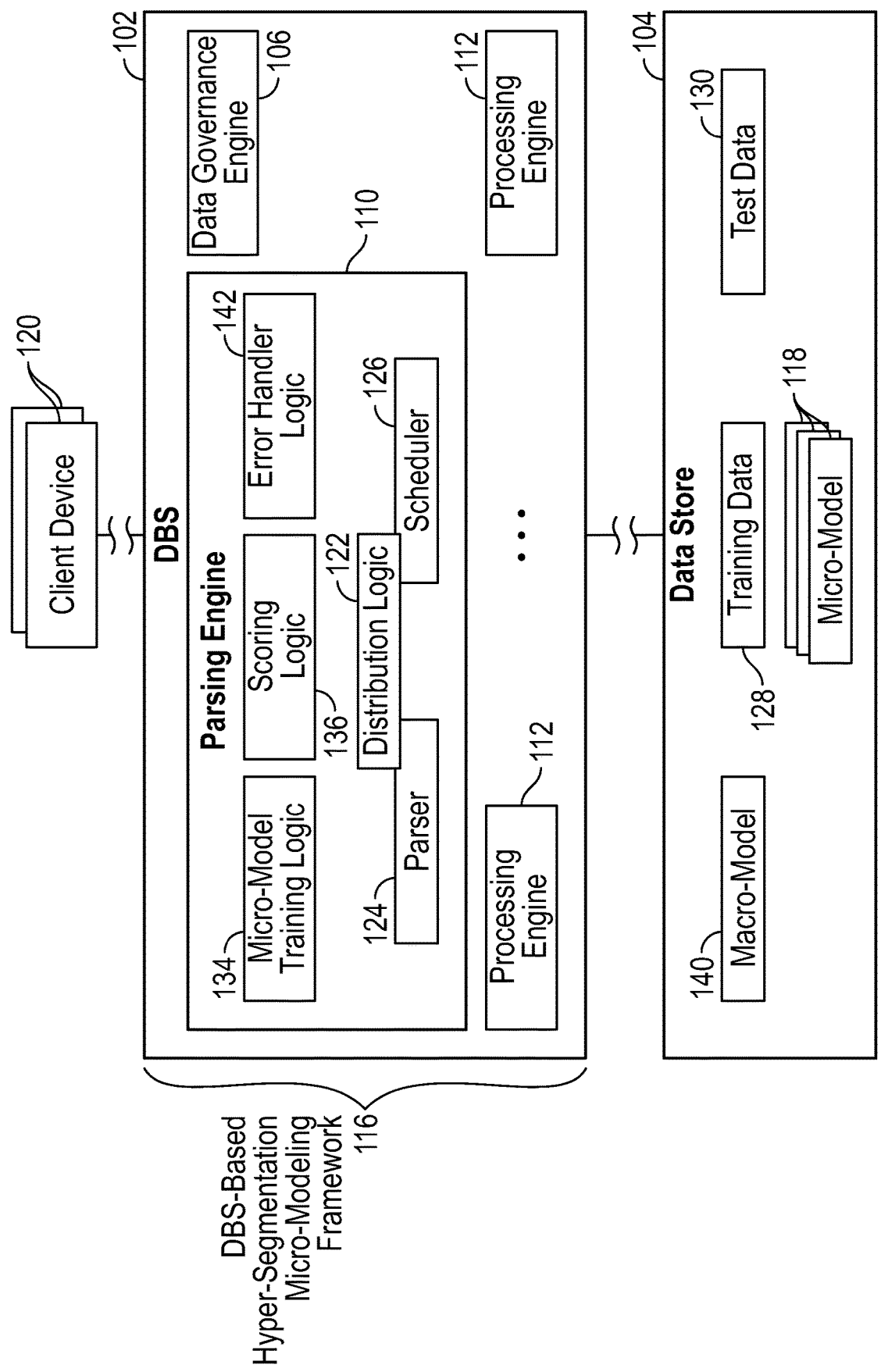
FIG. 1 is a block diagram of an example arrangement that includes a database management system and a data store, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Hyper-segmentation refers to highly personalized and highly segmented analytics that can be applied in different contexts, such as retail, banking, healthcare, medicine, communications, and so forth. Examples of personalized analytics include personalized shopping experience, product-level sales predictions, individual body reaction to drugs, behavioral patterns of individuals, a custom financial situation impacted by an individual's life events, and so forth.

Hyper-segmentation can be used to model trends within data belonging to diverse segments of entities (e.g., users, organizations, machines, programs, etc.). With hyper-segmentation, a separate model (referred to as a "micro-model") can be built for each segment. A large-scale implementation of hyper-segmentation for micro-modeling can be associated with various issues, including the scale of data, the quantity of segments, parallelization, tuning (which is part of "training") of individual micro-models, and scoring (also referred to as "predicting") using individual micro-models.

In accordance with some implementations of the present disclosure, a hyper-segmentation micro-modeling framework is implemented to provide a scalable, parallel, and user-friendly platform for micro-modeling.

Although reference is made to "hyper-segmentation" in some examples, it is noted that techniques or systems according to some implementations of the present disclosure can be applied to other examples in which separate models are used for different segments. More generally, a "micro-model" refers to a model that can be used for making a prediction on a specific data segment(s) that is (are) distinct from the data segment(s) associated with another model.

A large collection of data on which analytics are performed by enterprises (e.g., companies, government agencies, educational organizations, users, etc.) may include diverse data segments, where each data segment can exhibit a respective behavior, trend, or other characteristics. Examples include different characteristics in the data based on store, product, geographic region, customer activity, and so forth. For more accurate analytics, different micro-models are developed that are tailored to respective data segments. For example, features that are relevant to make predictions for a first data segment may be less relevant for another data segment. The micro-models individually tailored for respective data segments are distinguished from a macro-model that can be applied to an entire data set that includes all of the data segments. The macro-model can be trained on the entire data set, and can make predictions based on a data set including multiple data segments.

Implementing hyper-segmentation at large scale may face one or more of the following challenges.

First, the quantity of data segments can grow rapidly (e.g., there may be millions of data segments in a large data set), which means that building micro-models sequentially may be resource inefficient and time consuming (e.g., building the micro-models may take up a large amount of time).

Second, specifying individual features and parameters separately for a large quantity of micro-models may involve a lot of effort.

Third, associating the stored micro-models with data segments can be challenging if there are a large quantity of data segments, because the corresponding micro-model has to be picked for each data segment. The inability to quickly and efficiently associate micro-models with respective data segments may prevent real-time deployments in which micro-models are to be selected for data segments.

Fourth, tuning different features and parameters for different micro-models can become challenging at large scale.

Fifth, when there are a large quantity of micro-models, some of the micro-models may be "weak" if the amount of training data used to train some micro-models are relatively small. For example, some data segments may include relatively small quantities of data observations.

Example Implementations

In some examples of the present disclosure, a hyper-segmentation micro-modeling framework leverages the parallelism and data governance offered by parallel database systems. An example parallel database system (DBS) 102 is shown in FIG. 1. The DBS 102 is coupled to a data store 104. In some examples, the data store 104 can be implemented using storage device(s) that are "local" to the DBS 102, where the storage device(s) is (are) connected over a high-speed interconnect to the DBS 102.

In other examples, the data store 104 is a remote data store that is coupled over a network to the DBS 102. A network over which a remote data store is accessible can include a public network (e.g., the Internet), a local area network (LAN), a wide area network (WAN), a wireless network (e.g., a wireless local area the network or WLAN, a cellular network, etc.), or any other type of network. As an example, the remote data store can be accessible in a cloud, which can refer to any infrastructure, including computing, storage, and communication resources, that can be accessed remotely by devices over a network, such as a network 108 shown in FIG. 1. Alternatively, the remote data store can be provided in a data center or in any other computing environment.

The DBS 102 includes a parsing engine 110 that is able to process database queries (e.g., Structured Query Language or SQL queries), including data definition language (DDL) statements and data manipulation language (DML) statements. The processing of the database queries by the parsing engine 110 includes parsing the database queries, generating query plans for the database queries, and scheduling the query plans for execution.

In addition to the parsing engine 110, the DBS 102 includes a data governance engine 106 and multiple processing engines 112.

As used here, an "engine" (e.g., the parsing engine 110 or a processing engine 112) can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The data governance engine 106 manages access of data, such as to provide access control where some entities (e.g., users, programs, or machines) with proper credentials are permitted to access data of the DBS 102, while other entities without proper credentials are denied access to data of the DBS 102. The data governance engine 106 can also manage consistency of data, such as to ensure that the latest (fresh) data is retrieved in response to a read request, or to prevent write conflicts of data.

Each processing engine 112 may include one or more processors. For example, each processing engine 112 may include a respective computing node that has one or more processors. In other examples, each processing engine 112 may include a subset of processors within a computing node.

The multiple processing engines 112 are able to execute in parallel with one another, and are able to access, in parallel, different data portions (e.g., different objects 114, different portions of objects 114) of the remote data store 104. Each processing engine 112 is considered a Unit of Parallelism (UOP) that is able to execute in parallel (e.g., concurrently or simultaneously) with one or more other UOPs. Each UOP is able to perform a local relational operation, such as a join operation (e.g., to join data from multiple tables), a data aggregation operation (to aggregate multiple pieces of data into an aggregate value, such as a sum, maximum, minimum, average, median, etc.), an ordered analytic operation, and so forth. An ordered analytic operation refers to an operation that has an order specification (specifying an order based on one or more attributes, e.g., sorting based on the one or more attributes) or an expression that performs some predetermined analysis, such as ranking, computing a moving average within a window size, calculating a cumulative total, calculating a percentile, and so forth.

In a massively parallel DBS, there may be a large number of processing engines 112, such as hundreds, thousands, or even millions of processing engines 112.

A DBS-based hyper-segmentation micro-modeling framework 116 leverages a distribution mechanism of the parallel architecture and data governance provided by the DBS 102. The segmentation of data and micro-models is achieved using hash-based partitioning on a segment identifier used as a segmentation key. The segmentation of data produces data segments that can be distributed by a distribution logic 122, which can be part of the parsing engine 110 of the DBS 102. In some examples, the distribution logic 122 can be implemented as part of a parser 124 and a scheduler 126 in the parsing engine 110.

As used here, "logic" that is part of an "engine" can refer to a portion of the hardware processing circuit of the engine, or to machine-readable instructions executed by the hardware processing circuit of the engine (e.g., the distribution logic 122 can be implemented as machine-readable instructions executed by the hardware processing circuit of the parsing engine 110 to distribute data segments).

The parser 124 receives database queries (such as SQL queries, load requests, etc.) submitted by one or more client devices 120, which may be coupled to the DBS 102 over an interconnect (e.g., a network or another link). The parser 124 parses each received database query, and generates executable steps for the parsed query. The parser 124 includes an optimizer (not shown) that generates multiple query plans in response to a query. The optimizer selects the most efficient query plan from among the multiple query plans.

Each query plan includes a sequence of executable steps to perform to process the database query. The query plan can also include assignments of the executable steps across the processing engines 112. The scheduler 126 sends the executable steps of the selected query plan to respective processing engines 112, which execute the executable steps on respective data segments.

The hash-based partitioning applies a hash function on data to produce data segments. In some examples of the present disclosure, the hash function is applied on the values of the segment identifier that is included in data contained in the data store 104, including training data 128 used to train micro-models 118, and test data 130 on which the trained micro-models 118 can be applied to produce predicted results. The training data 128 includes training data samples, where each training data sample refers to a unit of data (e.g., a table row, etc.).

A segment identifier refers to a value that identifies a respective segment in data. In some examples, the training data 128 can be stored in a database table arranged as rows and columns, and the test data 130 can similarly be stored in a database table. The database table can include a column (also referred to as an "attribute") that includes the segment identifier. Different partitions of the database table can be associated with different values of the segment identifier.

A "hash function" can refer to a function that takes as input a value of an attribute (or values of multiple attributes) of a table row, and produces a number (a hash value) as an output.

To train the micro-models 118, the training data segments are distributed across the processing engines 112 using the segmentation key (including the segment identifier). The processing engines 112 can work simultaneously on their respective data segments (of the training data 128) to generate per-segment micro-models 118 concurrently and in parallel. Note that the micro-models 118 are also associated with respective values of the segment identifier, so that the hash-based partitioning can also be used to distribute the micro-models 118 across the processing engines 112 for use.

For scoring, data segments of the test data 130 and the micro-models 118 are distributed using the same hash-based partitioning mechanism based on the segmentation key, so that the test data segments and respective micro-models 118 are grouped and collocated on respective processing engines 112. For example, one or more first test data segments and one or more first micro-models 118 may be distributed to a first processing engine 112, one or more second test data segments and one or more second micro-models 118 may be distributed to a second processing engine 112, and so forth. To perform scoring, a micro-model 118 receives as input a test data segment, and produces a predicted output based on the input test data segment.

The DBS-based hyper-segmentation micro-modeling framework 116 is agnostic to the software (that implements a machine learning algorithm) used for the micro-models 118. The DBS-based hyper-segmentation micro-modeling framework 116 can use software implemented in the DBS 102 (native functions) and/or software in hosted libraries or other sources.

Also, each training data segment and test data segment may have a relatively small data size, so that a single-processor or a single-node implementation to train a micro-model 118 or to perform scoring using a micro-model 118 is appropriate. Parallelism can be exploited across data segments instead of within data segments (i.e., a data segment is not distributed).

In some examples, the parsing engine 110 includes a micro-model training logic 134 and a scoring logic 136. The micro-model training logic 134 controls the training (generation) of the micro-models 118. The scoring logic 136 controls the use of the micro-models 118 (as well as a macro-model 140 where appropriate as discussed further below) in performing scoring.

Although FIG. 1 shows the micro-modeling training logic and the scoring logic 136 as being part of the parsing engine 110 in some examples, it is noted that the micro-modeling training logic and/or the scoring logic 136 may be separate from the parsing engine 110 in other examples.

The micro-model training logic 134 and the scoring logic 136 can provide mechanisms for specifying features used in training micro-models 118 and scoring by micro-models 118, respectively. The features can be specified globally (i.e., the features are to apply to all training or test data segments) or on a segment basis (i.e., the features are to apply to a specific training or test data segment). The specification of features can be grouped and collocated with their respective data segment during training and scoring. Features refer to attributes (or columns) of data (training data 128 or test data 130) that are employed during training or scoring.

The micro-model training logic 134 and the scoring logic 136 also provide mechanisms to specify and tune parameters of micro-models 118, either on a global or segment basis. A parameter of a micro-model 118 can affect how the micro-model 118 is trained or performs when scoring. Different values of the parameter can change how the micro-model 118 is generated during training, or can change predicted outputs produced by the micro-model 118.

Among a large collection of the micro-models 118, it is possible that one or more of the micro-models 118 may be weak due to lack of sufficient data in respective training data segment(s) used to train the micro-model(s) 118. For example, a micro-model 118 is considered "weak" if an accuracy or confidence (a metric associated with the micro-model 118) in a result output by the micro-model 118 is less than a specified threshold.

The scoring logic 136 addresses a weak micro-model 118 by combining the macro-model 140 (stored in the data store 104) and the weak micro-model 118.

The macro-model 140 is trained on an entire dataset, such as the entirety of the training data 128. Note that a micro-model 118, in contrast, is trained on just a portion of the training data 128 (i.e., a training data segment). The scoring logic 136 can combine the macro-model 140 and a micro-model 118 by combining output results produced by the macro-model 140 and the micro-model 118. For example, a weighted aggregate (e.g., weighted average, weighted sum, etc.) of the output results produced by the macro-model 140 and the micro-model 118 can be calculated, and the weighted aggregate output result is used as a prediction output. Weights assigned to the output results produced by the macro-model 140 and the micro-model 118 may be proportional to the confidence (or other measures of accuracy) associated with the macro-model 140 and the micro-model 118, respectively.

The parsing engine 110 further includes an error handler logic 142 to handle errors associated with training micro-models 118. Errors in training a micro-model 118 may result from selection of an incorrect feature or parameter for the micro-model 118. In other examples, the error handler logic 142 may be external of the parsing engine 110.

The error handler logic 142 can provide a fail-safe mechanism to continue training the rest of the micro-models 118 while recording the errors for incorrect micro-models (micro-models exhibiting errors). The ability to continue training the remaining micro-models 118 can save significant time by avoiding the re-training of all the micro-models 118 due to errors in one or a few micro-models 118. Errors in micro-models 118 can be later fixed by a user or another entity, and further training can be run for just the micro-models 118 that failed based on respective training data segments.

Predictions by incorrect micro-models 118 based on test data segments can be set by the error handler logic 142 to a null value and an error code can be produced. Similarly, a null value and an error code can be returned by the error handler logic 142 for a missing micro-model 118, which was not generated based on a respective training data segment due to an error.

In further examples, a prediction of the macro-model 140 based on a respective test data segment can be used by the error handler logic 142 for an incorrect or missing micro-model 118.

Training

The micro-model training logic 134 can accept several input tables, including a training table (TrainingTable) that contains the training data 128 for all segments identified by respective segment identifier values, an attribute table (AttributeTable) containing names of attributes to be used as features for respective data segments, and a parameter table (ParameterTable) containing parameters to be used for respective micro-models 118.

Note that the attribute table and the parameter table are optional inputs.

In some examples, a micro-modeling framework training application programming interface (API) (referred to as "MF TRAIN API") used to invoke a training process for micro-modeling can be as follows:

```
MF TRAIN API:

SELECT * FROM MF TRAINING (
      ON <table | view | query> AS TrainingTable PARTITION BY
        <segment_key>
      [ ON <table | view | query> AS AttributeTable PARTITION BY
        <segment_key>]
      [ ON <table | view | query> AS ParameterTable PARTITION BY
        <segment_key>]
      USING
        ModelType (model_type)
        <feature_inputs>
        <parameter_inputs>
        <macro_combination_inputs>
        <error_handler_inputs>
    );
```

The above training database query can be submitted by a requesting entity, such as a client device 120 or another entity, to request the generation (training) of the micro-models 118 initiated by the micro-model training logic 134.

In the foregoing, segment_key is the segmentation key in the form of a segment identifier, and ModelType specifies the type of a micro-model to be trained. Examples of micro-model types include any or some combination of the following: Generalized Linear Model (GLM), Linear Regression, Logistic Regression, Support Vector Machine (SVM), Naive Bayes, Decision Tree, Decision Forest, eXtreme Gradient Boosting (XGBoost), and so forth. The value of the ModelType argument identifies, to the micro-model training logic 134, a library or other model source to be used for model training, scoring, and verification.

The feature inputs (feature_inputs) specify global features (including one or more attributes) to be shared by all micro-models 118, including numeric attributes, categorical attributes, and so forth.

The parameter inputs (parameter_inputs) specify the model parameters shared by all data segments. For example, for GLM, these parameters include Family, MaxIterations, StopThreshold, RegularizationLambda, RegularizationAlpha, and so forth.

The macro-micro combination inputs (macro_combination_inputs) specify the parameters for combining macro- and micro-models (discussed further below).

The error handler inputs (error_handler_inputs) specify the parameters for error handling (discussed further below)

Figure 2:
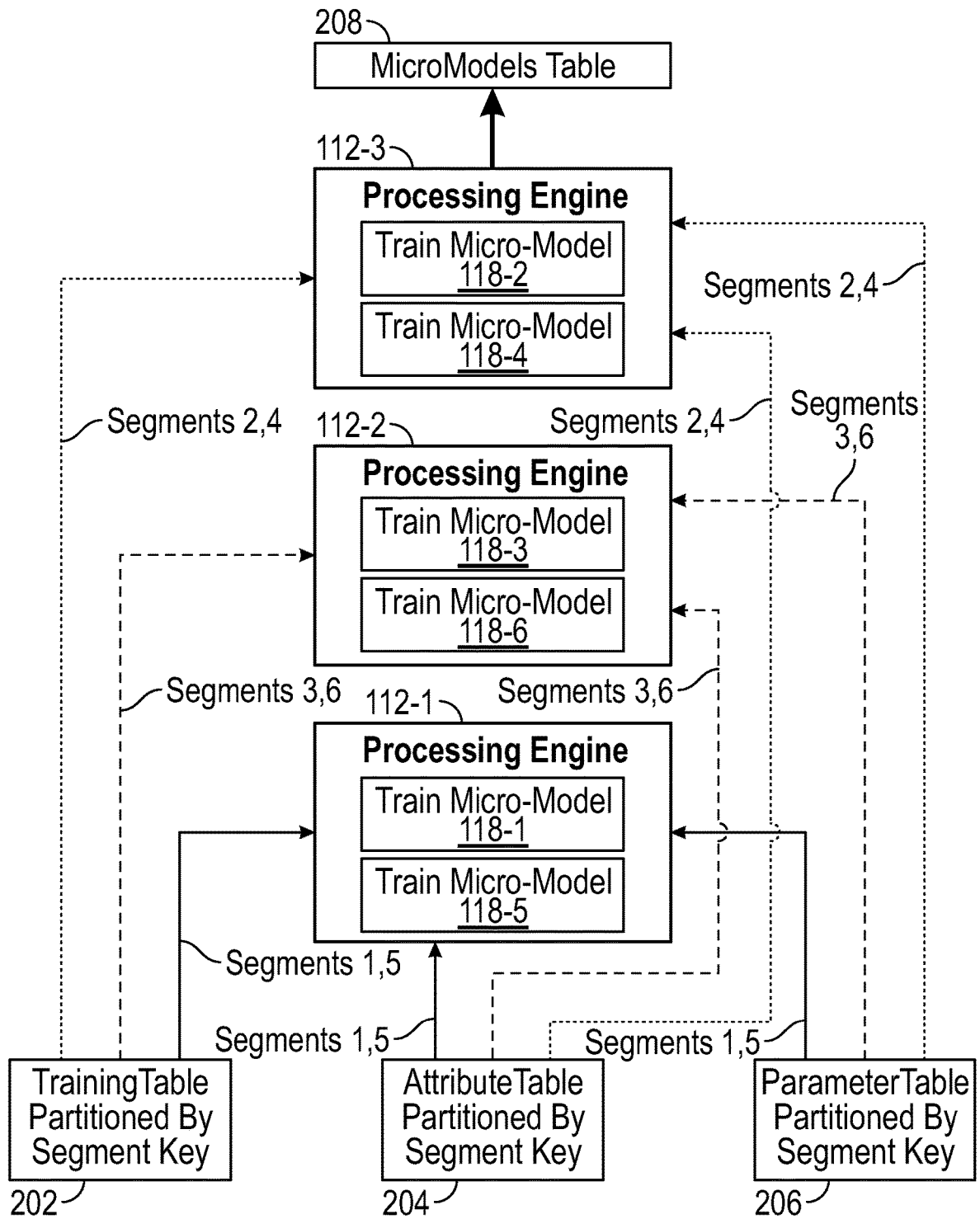
FIG. 2 is a block diagram of a micro-model training process according to some implementations of the present disclosure.

FIG. 2 is a block diagram of a micro-model training process that can be initiated by the micro-model training logic 134 in response to receipt of a training database query as set forth above.

As shown in FIG. 2, a TrainingTable 202 contains training data that is partitioned by the segmentation key. In addition, an AttributeTable 204 contains attributes to be used as features for model training, and the attributes are partitioned by the segmentation key. A ParameterTable 206 contains values of parameters to be used as parameters of micro-models 118 when performing model training, and the values of the parameters are partitioned by the segmentation key.

In each of the TrainingTable 202, AttributeTable 204, and ParameterTable 206, a column includes values of the segment identifier to be used as the segmentation key. Different values of the segment identifier identify respective different segments. For example, a first partition of rows in the TrainingTable 202, AttributeTable 204, or ParameterTable 206 can be associated with a first value of the segment identifier, a second partition of rows in the TrainingTable 202, AttributeTable 204, or ParameterTable 206 can be associated with a second value of the segment identifier, and so forth.

The distribution logic 122 (FIG. 1) partitions the input tables (TrainingTable 202, AttributeTable 204, and ParameterTable 206) based on hashing the segmentation key. In the example of FIG. 2, each processing engine 112-1, 112-2, and 112-3 is assigned two segments. For example, the processing engine 112-1 is assigned segments 1 and 5, the processing engine 112-2 is assigned segments 3 and 6, and the processing engine 112-3 is assigned segments 2 and 4. Although the example assumes just three processing engines, it is noted that there may be a different quantity of processing engines in other examples. Also, a processing engine may be assigned one or more segments.

Based on the partitioning above, each processing engine 112-1, 112-2, and 112-3 receives respective segments of the TrainingTable 202, AttributeTable 204, and ParameterTable 206.

The processing engine 112-1 trains micro-models 118-1 and 118-5 for segments 1 and 5, respectively, the processing engine 112-2 trains micro-models 118-3 and 118-6 for segments 3 and 6, respectively, and processing engine 112-3 trains micro-models 118-2 and 118-4 for segments 2 and 4, respectively. Note that the processing engines 112-1, 112-2, and 112-3 can receive respective segments of the TrainingTable 202, AttributeTable 204, and ParameterTable 206 and perform respective micro-model training in parallel.

The micro-models generated by the processing engines 112-1, 112-2, and 112-3 are inserted into a result Micro-Models table 208, which includes a column containing the segment identifier and a column containing a name of a micro-model. The values of the segment identifier in the result MicroModels table 208 are used to partition the micro-models identified by the result MicroModels table 208 into respective different partitions for distribution across the processing engines 112-1, 112-2, and 112-3 when the micro-models 118-1 to 118-6 are to be applied to test data.

The hashing distribution ensures that the processing engines 112-1, 112-2, and 112-3 have roughly an equal number of segments assigned to them. Some segments may have more data compared to other segments and their training may take more time. However, random distribution of segments to processing engines can result in uniform distribution among the processing engines so that the processing engines can complete their operations roughly at the same time.

Due to lack of data, some of the micro-models may be weak. For such weak micro-model, the scoring logic 136 can combine results of the macro-model 140 and a weak micro-model 118. The macro-model 140 is a global model trained for the entire dataset. Training the global macro-model 140 can be performed serially or in parallel with training of the micro-models 118.

Scoring

The scoring logic 136 can accept several input tables, including a test table (TestTable) that contains test data for all segments identified by respective segment identifiers, a micro-models table (MicroModels) (e.g., 208 in FIG. 2) that contains trained micro-models for all segments identified by respective segment identifiers, and a macro-model table (MacroModel) containing the macro-model 140 for the entire training dataset. The macro-model 140 is replicated by the distribution logic 122 to all processing engines 112 at runtime so that they can leverage the macro-model 140 to generate a prediction using a macro-micro model combination.

In some cases, the macro-model 140 may employ a different format (e.g., format of output data) than the micro-models 118. In such examples, a converter can be provided to convert the output data of the macro-model 140 or the output data of a micro-model 118 to provide a consistent format for combining the results of the macro-model 140 and the micro-model 118.

In some examples, a micro-modeling framework score API (referred to as "MF SCORE API") used to invoke a scoring process by micro-models 118 can be as follows:

---
MF SCORE API:
---
SELECT * FROM MF Score (
  ON <table | view | query> AS TestTable PARTITION BY ON <table | view | query> AS MicroModels PARTITION BY
  < segment_key >
  [ ON <table | view | query> AS MacroModel DIMENSION ]
USING
  <parameter_inputs>
  <macro_combination_inputs>
  <error_handler_inputs>
);
---

The above scoring database query can be submitted by a requesting entity, such as a client device 120 or another entity, to request scoring by the micro-models 118 initiated by the scoring logic 136.

In the foregoing, the parameter inputs (parameter_inputs) specify the parameters of the micro-models 118 for making a prediction. The macro-micro combination inputs (macro_combination_inputs) specify the parameters for combining macro- and micro-models.

The error handler inputs (error_handler_inputs) specify the parameters for error handling (discussed further below).

Other details such as model type, which features to use during prediction, and so forth, are obtained from the model inputs (MicroModels and MacroModel).

Figure 3:
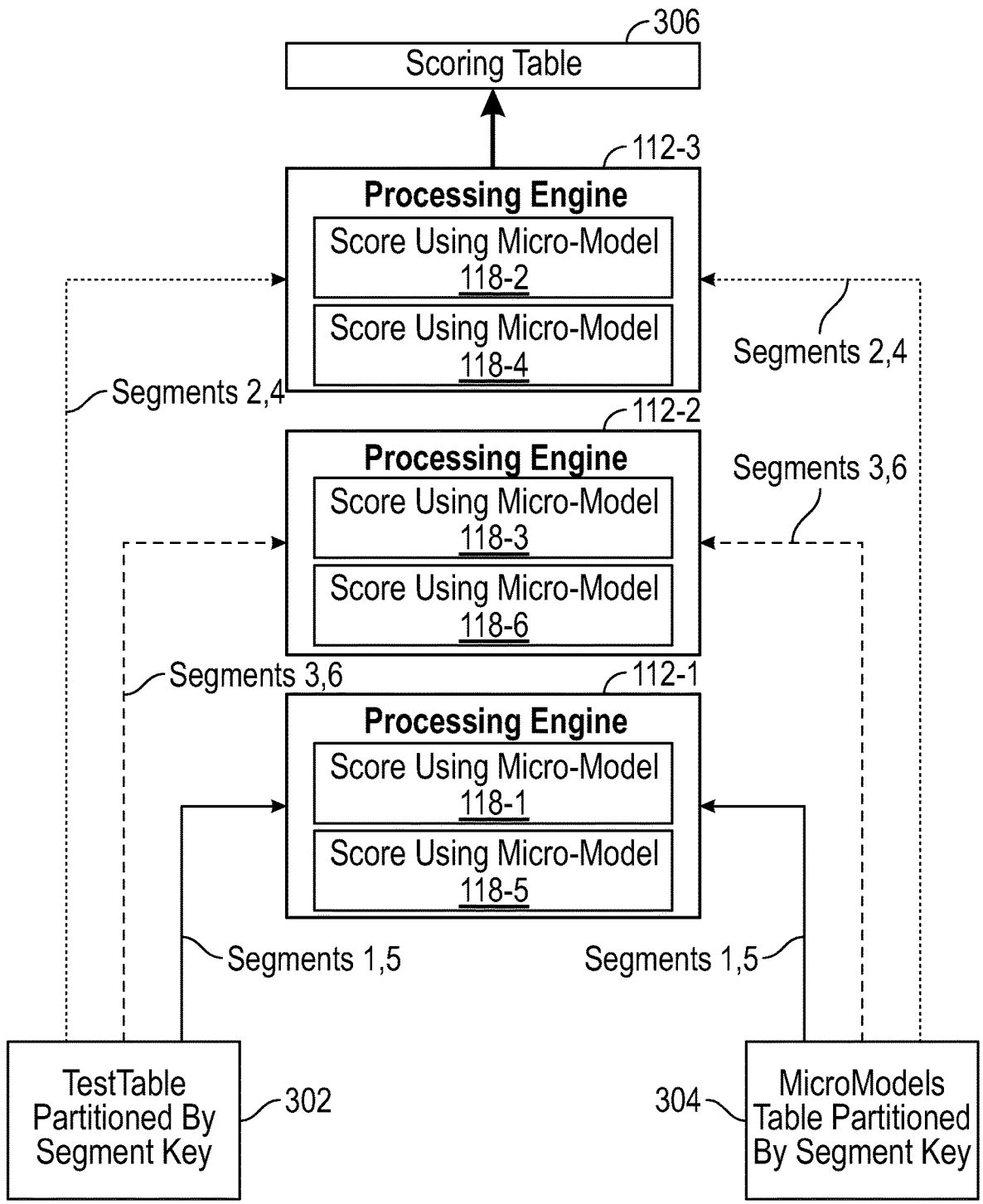
FIG. 3 is a block diagram of a scoring process according to some implementations of the present disclosure.

FIG. 3 is a block diagram of a model scoring process that can be initiated by the scoring logic 136 in response to receipt of a scoring database query as set forth above.

As shown in FIG. 3, a TestTable 302 contains test data that is partitioned by the segmentation key. In addition, a Micro-Models table 304 contains names of micro-models that are partitioned by the segmentation key.

In each of the TestTable 302 and the MicroModels table 304, a column includes values of the segment identifier to be used as the segmentation key. Different values of the segment identifier identify respective different segments.

The distribution logic 122 (FIG. 1) partitions the input tables (TestTable 302 and MicroModels table 304) based on hashing the segmentation key. In the example of FIG. 3, each processing engine 112-1, 112-2, and 112-3 is assigned two segments, similar to FIG. 2.

Based on the partitioning above, each processing engine 112-1, 112-2, and 112-3 receives respective segments of the TestTable 302 and the MicroModels table 304.

The processing engine 112-1 applies scoring using the micro-models 118-1 and 118-5 trained according to FIG. 2, the processing engine 112-2 applies scoring using the micro-models 118-3 and 118-6 trained according to FIG. 2, and the processing engine 112-3 applies scoring using the micro-models 118-2 and 118-4 trained according to FIG. 2. The micro-models 118-1 to 118-6 are applied to respective test data segments to produce prediction outputs.

Note that the global macro-model 140 can be copied to all of the processing engines 112-1 to 112-3.

The processing engines 112-1, 112-2, and 112-3 generate prediction (scoring) outputs, which can be stored in a scoring table 306. The scoring table 306 includes a column containing the segment identifier and a column containing the scoring outputs. The values of the segment identifier in the scoring table 306 are used to partition the scoring outputs into respective different partitions.

The scoring outputs that contain segment-specific outputs (e.g., predictions, probability estimations, and so forth) can be integrated with post-processing tools such as a Confusion Matrix, a Receiver Operating Characteristic (ROC) curve, and so forth, to evaluate the models.

Note that the post-processing tools may be integrated not only in a post-processing stage but can also to be invoked during parameter tuning for model evaluation, which is discussed further below.

In some examples, the DBS-based hyper-segmentation micro-modeling framework 116 can be provided with dashboards or other user-facing applications, to generate reports.

Feature Selection

The DBS-based hyper-segmentation micro-modeling framework 116 seeks to generate custom segment models (micro-models 118) that are specialized not only due to the observations (training data segment) pertaining to a segment but also due to features uniquely significant to each micro-model. In some examples, the DBS-based hyper-segmentation micro-modeling framework 116 provides a convenient way to manually or automatically select and specify segment-specific features (predictors to be used for a micro-model) using a respective portion of the AttributeTable 204.

An example to specify features in the AttributeTable 204 is as follows:

| segment_key | feature | type |
| --- | --- | --- |
| 1 | country | categorical |
| 1 | driveway | categorical |
| 1 | bedrooms | numerical |
| 2 | country | categorical |
| 2 | bathrooms | numerical |
| 3 | ... | ... |
| ... | ... | ... |

The segment_key column contains values of the segment identifier, the feature column includes names of attributes, and the type column identifies the type of attribute (e.g., numerical or categorical).

During training of a given micro-model, the DBS-based hyper-segmentation micro-modeling framework 116 reads these features for the given micro-model from a corresponding partition of the AttributeTable 204, and applies the features to the training of the given micro-model individually.

Using the DBS-based hyper-segmentation micro-modeling framework 116, users do not have to manually supply segment specific features (in cases where the framework 116 provides automatic feature selection whose output is automatically inserted into the AttributeTable 204) or do not have to write custom files for each segment and input those files during training. Maintaining and specifying such files, which may be frequently modified, can be unwieldy, particularly if there are a large quantity of the files (e.g., millions of files).

Additionally, the DBS-based hyper-segmentation micro-modeling framework 116 also provides users with the option to globally specify features common to all micro-models. This can be achieved using the feature inputs (feature_inputs) in the MF TRAIN API discussed further above. If features are common to all segments, the use of the AttributeTable 204 is optional in such cases. If features are specified using both options, the AttributeTable specification takes precedence over features listed in the feature inputs (feature_inputs). For example, if the AttributeTable 204 specifies that features A and B are to be used for training a given micro-model, and the feature inputs specify that X, Y, and Z are to be used for training all micro-models 118, then the specification in the AttributeTable 204 takes precedence and features A and B (but not features X, Y, and Z) are used to train the given micro-model.

In some examples, the DBS-based hyper-segmentation micro-modeling framework 116 is able to transform categorical features to segment-specific numerical values in the DBS 102 using any of various encoding mechanisms, such as One-hot encoding, Target encoding, and so forth. The DBS-based hyper-segmentation micro-modeling framework 116 can include the corresponding transformation information in the trained micro-model to be used during scoring.

In some examples, the DBS-based hyper-segmentation micro-modeling framework 116 supports a regularization capability for certain micro-models, such as GLM, SVM, and XGBoost. L1 regularization provides another way to perform automatic feature selection. However, it comes with a set of tunable parameters, which is discussed in more detail below.

Parameter Specification and Tuning

In some examples, the DBS-based hyper-segmentation micro-modeling framework 116 provides users the ability to automatically tune and specify parameters for segments in several ways, similar to feature specification discussed above. The parameters can be input as global parameters (parameter_inputs) applicable to all segments. Alternatively, segment-specific parameters can be specified using the ParameterTable 206. The ParameterTable specification take precedence in case a parameter is specified using both options. An example of how to specify parameters in the ParameterTable 206 is as follows:

| segment_key | parameter | value |
|---|---|---|
| 1 | alpha | 0.3 |
| 1 | lambda | 3.0 |
| 1 | iterations | 20 |
| 2 | alpha | 0.5 |
| 2 | lambda | 1.0 |
| 2 | iterations | 50 |
| 3 | ... | ... |
| ... | ... | ... |

The segment_key column contains values of the segment identifier, the parameter column includes names of parameters, and the value column sets the value of the parameter.

During training of a micro-model 118, the DBS-based hyper-segmentation micro-modeling framework 116 reads parameters for the micro-model 118 from ParameterTable (or <parameter_inputs>) and applies the parameters to the micro-model 118 individually.

Parameter tuning can be performed in some examples to improve training of micro-models. During parameter tuning, a micro-model is trained with different sets of parameters to produce multiple instances of the micro-model, evaluated with a predefined metric, and the best instance of the micro-model is chosen for deployment. Performing tuning for different sets of parameters for a large quantity of segments can be challenging. The DBS-based hyper-segmentation micro-modeling framework 116 provides different ways (e.g., global tuning or local tuning discussed below) to perform parameter tuning automatically (without any user intervention) for all segments.

Global Tuning

With global tuning, a common range of parameter values can be specified for all segments. To achieve this, users can use the option <parameter_inputs> specified in the MF TRAIN API. For each parameter, a user can specify a range or set of parameter values to be tried, and metric to be evaluated. The DBS-based hyper-segmentation micro-modeling framework 116 splits the data for each segment internally, trains the micro-model for each combination of parameters, and generates a micro-model that provides the best result based on a predefined metric. Each processing engine 112 generates a tuned micro-model for one segment before processing the next segment in that processing engine 112. This can be useful in case of a failure (such as due to a power off event, a network down event, a storage full event, etc.) so that a micro-model does not have to be tuned after recovery. Further details are provided below.

Because the DBS-based hyper-segmentation micro-modeling framework 116 provides ways to specify inputs in the form of database tables (ParameterTable in the MF TRAIN API, for example), for selective tuning (tuning for only specific segments), users can create a view of the input table with only tunable segments in the view, and supply that view as an input to the MF TRAIN API.

Local Tuning

With local tuning, users can tune parameters for a single segment using different sets of parameters. A cluster of processing engines 112 can be employed to evaluate respective sets of parameters in parallel. The TrainingTable 202 containing test data is prepared in a manner such that the TrainingTable 202 contains only training data of a single segment that is replicated as many times as the number of parallel processing engines 112 in the cluster. The parameters are specified using the parameter_inputs option, and the DBS-based hyper-segmentation micro-modeling framework 116 coordinates model training for different parameter combinations in parallel on available processing engines 112 in the cluster. A best micro-model is generated for each processing engine on its set of parameters along with metric results. A user can select the best model out of these models using the metric criteria.

Machine Learning Algorithms

The DBS-based hyper-segmentation micro-modeling framework 116 can leverage any of various different types of machine learning algorithms that are available either internally in the DBS 102 or in hosted libraries or other sources. The DBS-based hyper-segmentation micro-modeling framework 116 can provide an API for configuring hosted libraries or other sources. The argument ModelType in the MF TRAIN API identifies the machine learning library to be used for micro-model training, scoring, and verification. These libraries are loaded by the DBS-based hyper-segmentation micro-modeling framework 116 at runtime during training or scoring. In cases where there is a large segment (with a large quantity of data) that may be too large to be processed by a single processing engine, a pre-processing stage can be applied that samples the large segment to a manageable size. Sampling refers to selecting a subset of the data in the segment (e.g., 50% of the data in the segment, 25% of the data in the segment, etc.).

Macro-Micro Scoring

As discussed above, the DBS-based hyper-segmentation micro-modeling framework 116 can combine predictions from the macro-model 140 and a micro-model 118 in cases where the micro-model 118 is weak.

Both the MF TRAIN API and the MF SCORE API allow for input of macro-micro combination inputs (macro_combination_inputs). Examples of macro_combination_inputs include: lower_threshold, upper_threshold, and a weight.

The parameter lower_threshold specifies a minimum quantity of observations (quantity of training data samples) in a segment to be considered for micro-modeling. Below this threshold, only the macro-model 140 will be used by the DBS-based hyper-segmentation micro-modeling framework 116 for prediction.

The parameter upper_threshold specifies a maximum quantity of observations (quantity of training data samples) in a segment to be considered for macro-modeling. Above this threshold, only a micro-model 118 will be used by the DBS-based hyper-segmentation micro-modeling framework 116 for prediction.

If the quantity of observations is between lower_threshold and upper_threshold, then a combination of the macro-model 140 and a micro-model 118 will be used for prediction.

A weight parameter (w) is specified as part of macro_combination_inputs, where w is between 0.0 and 1.0.

For example, a combined prediction (combined_prediction) based on combined use of the macro-model 140 and a micro-model 118 can be defined as follows:

$$\text{combined\_prediction} = w * microprediction + (1 - w) * macroprediction.$$

In the above, microprediction represents an output produced by the micro-model 118, and macroprediction represents an output produced by the macro-model 140.

A prediction from a model (e.g., the macro-model 140 or the micro-model 118) may be in the form of a probability score, where the model is used to perform classification. Similar combinations can be applied for binary and multi-class classifications. If a user does not supply the weight (w), w can be calculated for each segment using the relation: $w = n/(n+\lambda)$ (or alternatively, $w = (n - lower\_threshold)/(n - lower\_threshold + \lambda)$), where n is the quantity of observations in the segment and $\lambda$ is a regularization parameter. Note that for smaller segments (n is small) w will be small and the scoring of the macro-model 140 dominates the prediction result. As n increases, the value of w increases to the asymptotic value of 1 and the micro-model scoring takes over the prediction. The parameter $\lambda$ is a regularization parameter used for weight calculation. The regularization parameter $\lambda$ can be a predefined value in the system or supplied as part of macro_combination_inputs. A separate training task can be performed to find the optimal value of the regularization parameter $\lambda$ based on a training dataset.

The macro-micro combination inputs (macro_combination_inputs) can be supplied during training or scoring. If supplied during training, the micro-model training logic 134 skips training for micro-models for segments having a quantity of observations below lower_threshold. Also, the macro-micro combination inputs can be included in the micro-model so that the macro-micro combination inputs do not have to be re-specified at the time of scoring. Alternatively, a user can choose to supply macro-micro combination inputs only during scoring, in which case the micro-model scoring logic 136 will ignore any trained micro-models for which a quantity of training observations falls below lower_threshold (note that in some examples the quantity of training observations may be stored along with a respective micro-model).

Figure 4:
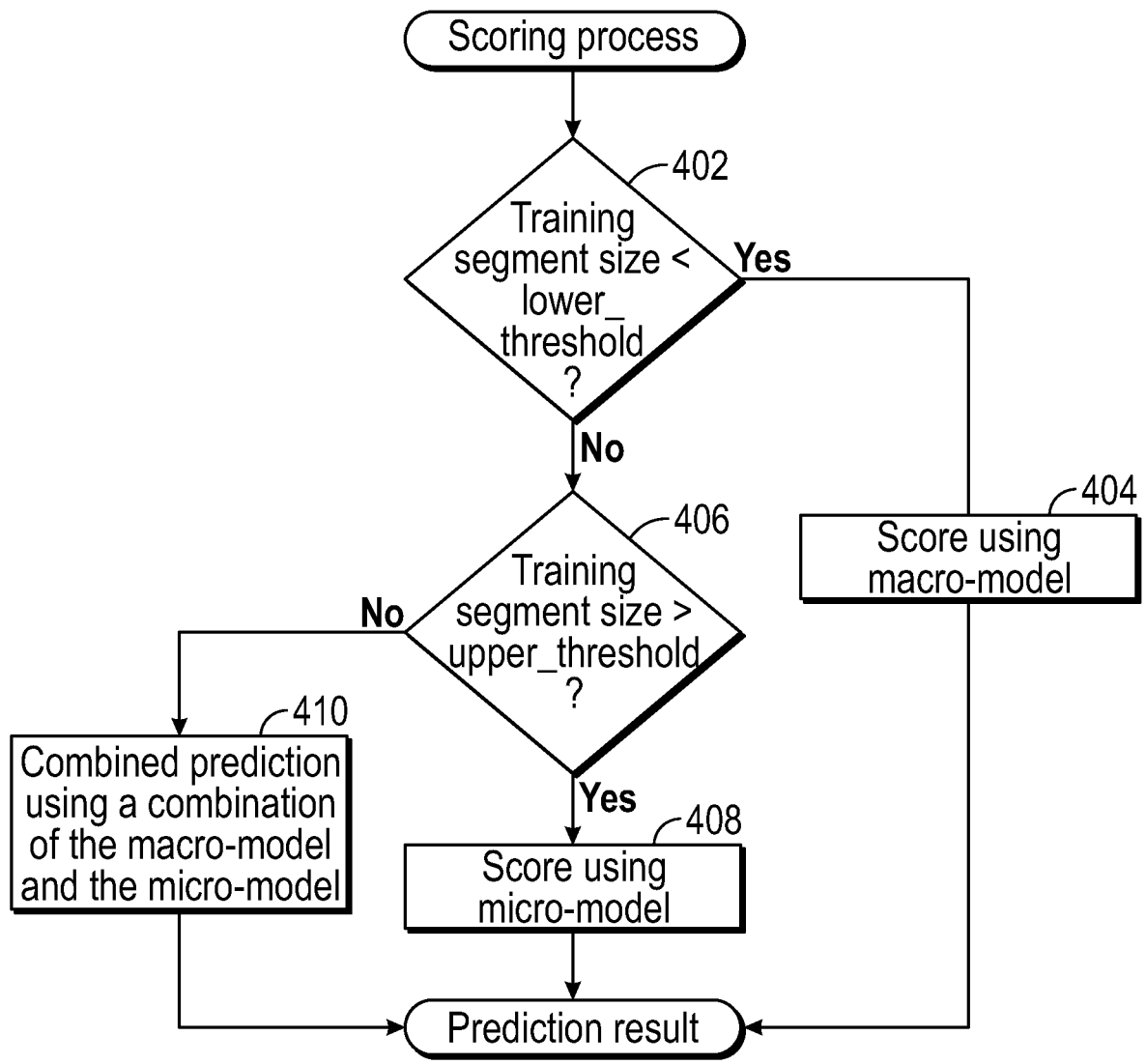
FIG. 4 is a flow diagram of a scoring process according to further examples.

FIG. 4 is a flow diagram of a scoring process performed using the scoring logic 136 according to some examples. The scoring process can be initiated when the scoring logic 136 receives a scoring database query, such as through the MF SCORING API discussed above. Note that multiple instances of the scoring process can be performed by multiple respective processing engines 112 in parallel.

The scoring logic 136 determines (at 402) if a training segment size of a segment is less than lower_threshold. The training segment size represents the quantity of training data samples available to train a respective micro-model for the segment. If the training segment size is less than lower_threshold, the scoring logic 136 initiates (at 404) scoring using the macro-model 140 (and not a micro-model for the segment).

If the training segment size is not less than lower_threshold, the scoring logic 136 determines (at 406) if the training segment size of the segment is greater than upper_threshold. If the training segment size is greater than upper_threshold, then the scoring logic 136 initiates (at 408) scoring using the micro-model 118 for the segment.

If the training segment size is between lower_threshold and upper_threshold, the scoring logic 136 initiates (at 410) a combined prediction using a combination of the macro-model 140 and the micro-model for the segment.

Error Handling

Training a large quantity of micro-models can produce errors that may lead to re-iterating micro-modeling training a number of times, which can be time-consuming. Errors when generating micro-models 118 may be due to errors in the training data, specification of incorrect features, specification of incorrect parameters, and so forth.

The error handler logic 142 provides a fail-safe mechanism to deal with such errors. The error handler inputs (error_handler_inputs) can be specified with a training database query (e.g., using the MF TRAIN API) to control the behavior in response to errors. If enabled, the error handler logic 142 allows training of remaining micro-models 118 to continue, while errors for the faulty micro-models are recorded.

The error information is displayed in the output table for each segment so that the segments with errors can be later fixed by a user. In a subsequent training run, the Micro-Models table (an output of previous run) can be provided as an input to the MF TRAIN API and any model successfully generated previously will be skipped in the subsequent training run. This saves significant time by avoiding re-training all micro-models due to errors of a few micro-models.

During scoring, the error_handler_inputs can be used to control the behavior in case of micro-model or scoring errors. For example, the error_handler_inputs can specify to continue prediction using properly functioning micro-models, while null results can be returned for micro-models that are exhibiting errors. Alternatively, for a micro-model that is experiencing an error, a prediction of the macro-model can be used instead.

If error handling is disabled, the error handler logic 142 can terminate the training or scoring process as soon as it encounters an error.

Example Database Architecture

Figure 5:
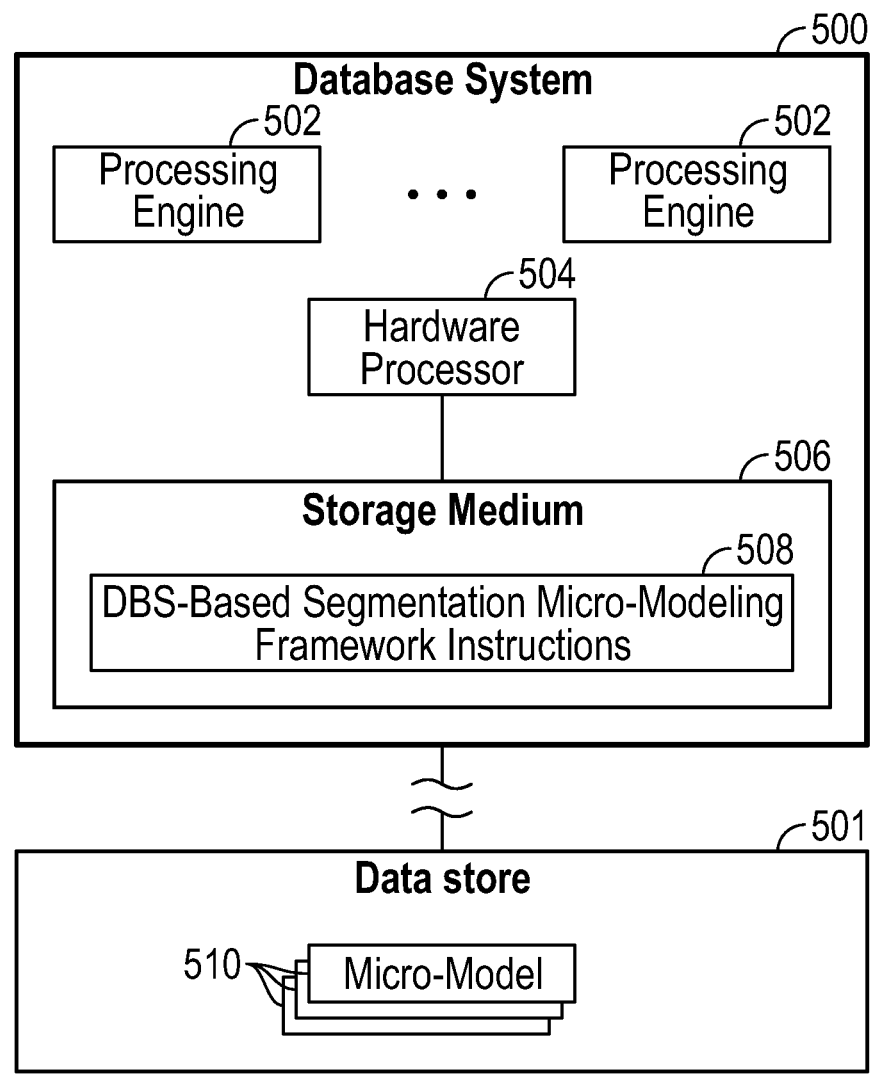
FIG. 5 is a block diagram of an example database system according to some implementations of the present disclosure.

FIG. 5 is a block diagram of an example database system 500, such as the DBS 102 of FIG. 1, according to some implementations of the present disclosure.

The database system 500 includes multiple processing engines 502 (similar to 112 in FIG. 1) to access data in a data store 501 (e.g., similar to 104 in FIG. 1).

The database system 500 includes one or more hardware processors 504. A hardware processor can include a microprocessor, a core of a multi-core microprocessor, a microcontroller, a programmable integrated circuit, a programmable gate array, or another hardware processing circuit.

The database system 500 includes a non-transitory machine-readable or computer-readable storage medium 506 that stores machine-readable instructions executable on the one or more hardware processors 504 to perform respective tasks. The machine-readable instructions include DBS-based segmentation micro-modeling framework instructions 508.

The DBS-based segmentation micro-modeling framework instructions 508 receive data (training data or testing data) relating to plural micro-models 510 that apply respective analytics.

The DBS-based segmentation micro-modeling framework instructions 508 distribute a plurality of data segments of the received data across the multiple processing engines 502 based on values of a segmentation key (e.g., a segment identifier) included in the received data.

The multiple processing engines 112 perform, in parallel, operations (micro-model training or scoring) associated with the plural micro-models 510 using respective data segments of the plurality of data segments, where different processing engines of the multiple processing engines 502 perform operations associated with respective micro-models of the plural micro-models 510.

The DBS-based segmentation micro-modeling framework instructions 508 receive attribute information (e.g., an attribute table) including values of one or more attributes to use as features in training the plural micro-models 510. The values of the one or more attributes in the received attribute information are partitioned into a plurality of attribute segments based on values of the segmentation key included in the received attribute information. The plurality of attribute segments are distributed across the multiple processing engines 502 for use in training respective micro-models of the plural micro-models 510.

The DBS-based segmentation micro-modeling framework instructions 508 receive model parameter information (e.g., a parameter table) including values of one or more parameters for the plural micro-models 510. The values of the one or more parameters in the received model parameter information are partitioned into a plurality of model parameter segments based on values of the segmentation key included in the received model parameter information. The plurality of model parameter segments are distributed across the multiple processing engines 502 for use in training respective micro-models of the plural micro-models 510.

The DBS-based segmentation micro-modeling framework instructions 508 are to receive a training database query (e.g., in the MF TRAIN API) to invoke a training process for training the plural micro-models 510, and invoke the training process in response to the training received database query. The training database query can specify one or more of a feature to use for training the plural micro-models 510, and a parameter of the plural micro-models 510.

The DBS-based segmentation micro-modeling framework instructions 508 are to receive a scoring database query to invoke a scoring process to use the plural micro-models 510 in predicting outputs, and invoke the scoring process in response to the received scoring database query. The scoring database query can specify a first table containing the test data, and a second table containing the plural micro-models 510. The scoring database query can further specify a macro-model to use for a prediction over an entirety of the test data. The scoring database query can further a parameter relating to a combined use of a macro model and each micro-model of the plural micro-models.

The storage medium 506 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A database system comprising:
a plurality of processing engines;
at least one processor; and
a non-transitory storage medium storing instructions executable on the at least one processor to:
receive data relating to plural micro-models that apply respective analytics;
distribute a plurality of data segments of the received data across the plurality of processing engines based on values of a segmentation key included in the received data;

cause performance, in parallel by the plurality of processing engines, operations associated with the plural micro-models using respective data segments of the plurality of data segments, wherein different processing engines of the plurality of processing engines perform operations associated with respective micro-models of the plural micro-models;

determine whether a quantity of training data samples to train a first micro-model of the plural micro-models is less than a first threshold; and in response to determining that the quantity of training data samples to train the first micro-model is less than the first threshold, combine a prediction of the first micro-model with a prediction of a macro-model to produce a prediction output for a respective data segment, wherein the macro-model is trained on an entirety of training data, and the first micro-model is trained on a portion of the training data.

2. The database system of claim 1, wherein the received data comprises the training data for the plural micro-models, wherein the operations comprise training operations to train the plural micro-models using respective training data segments of the training data, and wherein the quantity of training data samples makes up a first training data segment of the training data segments.

3. The database system of claim 2, wherein the instructions are executable on the at least one processor to:

receive attribute information comprising values of one or more attributes to use as features in training the plural micro-models, the values of the one or more attributes in the received attribute information partitioned into a plurality of attribute segments based on values of the segmentation key included in the received attribute information; and distribute the plurality of attribute segments across the plurality of processing engines for use in training respective micro-models of the plural micro-models.

4. The database system of claim 2, wherein the instructions are executable on the at least one processor to:

receive model parameter information comprising values of one or more parameters for the plural micro-models, the values of the one or more parameters in the received model parameter information partitioned into a plurality of model parameter segments based on values of the segmentation key included in the received model parameter information; and distribute the plurality of model parameter segments across the plurality of processing engines for use in training respective micro-models of the plural micro-models.

5. The database system of claim 2, wherein the instructions are executable on the at least one processor to:

receive a database query to invoke a training process for training the plural micro-models; and invoke the training process in response to the received database query.

6. The database system of claim 5, wherein the database query specifies one or more of a feature to use for training the plural micro-models, and a parameter of the plural micro-models.

7. The database system of claim 1, wherein the received data comprises test data for the plural micro-models, wherein the operations comprise prediction operations by the plural micro-models to predict outputs using respective test data segments of the test data, and wherein the prediction of the first micro-model is part of a first prediction operation of the prediction operations.

8. The database system of claim 7, wherein the received data further comprises the plural micro-models associated with the values of the segmentation key, and wherein the instructions are executable on the at least one processor to:

distribute the plural micro-models across the plurality of processing engines according to the values of the segmentation key.

9. The database system of claim 7, wherein the instructions are executable on the at least one processor to:

receive a database query to invoke a scoring process to use the plural micro-models in predicting the outputs; and invoke the scoring process in response to the received database query.

10. The database system of claim 9, wherein the database query specifies a first table containing the test data, and a second table referring to the plural micro-models, the second table comprising a first column containing values of an attribute of the segmentation key, and a second column containing names of the plural micro-models, and wherein the instructions are executable on the at least one processor to:

partition the plural micro-models across the plurality of processing engines using the values of the attribute of the segmentation key in the first column of the second table.

11. The database system of claim 10, wherein the database query further specifies the macro-model, wherein the prediction of the macro-model is a prediction over an entirety of the test data, and wherein the prediction of the first micro-model is a prediction over only a portion of the test data.

12. The database system of claim 11, wherein the database query specifies a weight parameter relating to a combined use of the macro-model and each micro-model of the plural micro-models, and wherein the combination of the prediction of the first micro-model with the prediction of the macro-model is a weighted combination according to the weight parameter specified by the database query.

13. The database system of claim 9, wherein the database query specifies a parameter of the plural micro-models.

14. The database system of claim 1, wherein the instructions are executable on the at least one processor to:

distribute the plurality of data segments across the plurality of processing engines based on hashing the values of the segmentation key included in the received data.

15. The database system of claim 14, wherein the received data comprises a table including a column containing the values of the segmentation key for respective data segments of the plurality of data segments in the table.

16. A non-transitory machine-readable storage medium comprising instructions that upon execution cause a database system to:

receive a database query relating to a micro-modeling framework; and in response to the database query:

partition, based on values of a segmentation key, data relating to plural micro-models that apply respective analytics;

distribute a plurality of data segments derived from the partitioning of the data across a plurality of processing engines;

cause performance, in parallel by the plurality of processing engines, operations associated with the plural micro-models using respective data segments of the plurality of data segments, wherein different processing engines of the plurality of processing engines perform operations associated with respective micro-models of the plural micro-models;

determine whether a quantity of training data samples to train a first micro-model of the plural micro-models is less than a first threshold; and in response to determining that the quantity of training data samples to train the first micro-model is less than the first threshold, combine a prediction of the first micro-model with a prediction of a macro-model to produce a prediction output for a respective data segment that the first micro-model is to score, wherein the macro-model is trained on an entirety of training data, and the first micro-model is trained on a portion of the training data.

17. The non-transitory machine-readable storage medium of claim 16, wherein the operations associated with the plural micro-models comprise training the plural micro-models.

18. The non-transitory machine-readable storage medium of claim 16, wherein the operations associated with the plural micro-models comprise scoring using the plural micro-models.

19. The non-transitory machine-readable storage medium of claim 16, wherein the instructions upon execution cause the database system to:

determine whether a second quantity of training data samples to train a second micro-model of the plural micro-models is greater than the first threshold; and in response to determining that the second quantity of training data samples to train the second micro-model is greater the first threshold, use only a prediction of the second micro-model as a prediction output for another respective data segment that the second micro-model is to score.

20. The non-transitory machine-readable storage medium of claim 19, wherein the instructions upon execution cause the database system to:

determine whether a third quantity of training data samples to train a third micro-model of the plural micro-models is less than a second threshold, the second threshold being less than the first threshold; and in response to determining that the third quantity of training data samples to train the third micro-model is less than the second threshold, use only a prediction of the macro-model as a prediction output for a further data segment that the third micro-model is to score.

* * * * *